US008814171B2

(12) United States Patent
Beyer (10) Patent No.: US 8,814,171 B2
(45) Date of Patent: Aug. 26, 2014

(54) ENGINE SEALING ASSEMBLY (75) Inventor: Theodore Beyer, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 364 days.

(21) Appl. No.: 13/281,276

(22) Filed: Oct. 25, 2011

(65) Prior Publication Data

US 2013/0098315 A1 Apr. 25, 2013

(51) Int. Cl.
*F01P 3/12* (2006.01)
*F02M 69/00* (2006.01)
*F01P 3/02* (2006.01)
*F02F 11/00* (2006.01)
*F02M 53/04* (2006.01)
*F16J 15/08* (2006.01)
*F02M 69/04* (2006.01)

(52) U.S. Cl.
CPC .......... *F16J 15/0825* (2013.01); *F02M 53/043* (2013.01); *F02F 11/002* (2013.01); *F16J 2015/0862* (2013.01); *F02M 69/045* (2013.01)
USPC ........ 277/592; 277/591; 277/594; 123/41.31; 123/41.82 R; 123/193.3

(58) Field of Classification Search
CPC ...... F16J 15/0825; F16J 15/022; F02F 11/002
USPC ............. 123/41.31, 41.82 R, 193.3; 277/591, 277/592, 593, 594, 597
See application file for complete search history.

(56) References Cited

U.S. PATENT DOCUMENTS

| | | | |
|---|---|---|---|
| 4,267,977 A | | 5/1981 | Stockner et al. |
| 4,683,844 A | * | 8/1987 | Arai et al. .................. 123/41.74 |
| 5,205,566 A | | 4/1993 | Ueta et al. |
| 5,370,309 A | | 12/1994 | Strelbisky et al. |
| 5,860,394 A | | 1/1999 | Saito et al. |
| 6,260,518 B1 | * | 7/2001 | Jingu ..................... 123/41.82 R |
| 6,502,830 B2 | * | 1/2003 | Teranishi et al. ............. 277/594 |
| 6,550,782 B2 | * | 4/2003 | Okazaki et al. ............... 277/592 |
| 6,588,765 B2 | * | 7/2003 | Hiramatsu et al. ............ 277/591 |
| 6,612,272 B2 | * | 9/2003 | Kato et al. ............. 123/41.82 R |
| 6,976,683 B2 | | 12/2005 | Eckert et al. |
| 7,073,795 B2 | * | 7/2006 | Ueta et al. ..................... 277/591 |
| 7,249,578 B2 | | 7/2007 | Fricke et al. |
| 7,665,741 B2 | * | 2/2010 | Imai .............................. 277/592 |
| 7,669,859 B2 | * | 3/2010 | Imai .............................. 277/592 |
| 8,016,296 B2 | * | 9/2011 | Imai .............................. 277/593 |
| 8,100,409 B2 | * | 1/2012 | Schmitz ........................ 277/593 |
| 8,123,230 B2 | * | 2/2012 | Yoshijima et al. ............ 277/593 |
| 8,186,690 B2 | * | 5/2012 | Imai .............................. 277/595 |

(Continued)

FOREIGN PATENT DOCUMENTS

GB 720916 12/1954
JP 200002800 1/2000

*Primary Examiner* — Noah Kamen
*Assistant Examiner* — Grant Moubry
(74) *Attorney, Agent, or Firm* — James Dottavio; Alleman Hall McCoy Russell & Tuttle LLP (57) ABSTRACT A system for an engine is provided. In one embodiment, the system includes a cylinder head, an engine block, and a gasket assembly sealing the cylinder head to the engine block. Further, the gasket assembly may include a plurality of apertures positioned between an inner beading region and an outer beading region to concentrate a clamping load.

20 Claims, 4 Drawing Sheets (56) References Cited

U.S. PATENT DOCUMENTS

| | | | |
|---|---|---|---|
| 8,245,685 B2* | 8/2012 | Reinhart et al. | 123/196 R |
| 8,246,054 B2* | 8/2012 | Schmitt et al. | 277/593 |
| 8,267,407 B2* | 9/2012 | Schmucker | 277/594 |
| 8,567,790 B2* | 10/2013 | Kameyama et al. | 277/594 |
| 2005/0046118 A1 | 3/2005 | Yasuki et al. | |
| 2005/0110222 A1* | 5/2005 | Matsumoto et al. | 277/592 |
| 2006/0124765 A1 | 6/2006 | Kothen et al. | |
| 2006/0197288 A1* | 9/2006 | Sakamoto | 277/592 |
| 2008/0023923 A1 | 1/2008 | Kameyama et al. | |
| 2008/0143060 A1 | 6/2008 | Casler et al. | |
| 2009/0200754 A1* | 8/2009 | Schenk et al. | 277/595 |
| 2010/0007095 A1* | 1/2010 | Klinner | 277/592 |
| 2010/0025940 A1* | 2/2010 | Uchida et al. | 277/593 |
| 2010/0032909 A1 | 2/2010 | Beyer | |
| 2010/0109255 A1 | 5/2010 | Waldvogel et al. | |
| 2010/0326380 A1* | 12/2010 | Fedeson et al. | 123/41.82 R |
| 2012/0031354 A1 | 2/2012 | Beyer et al. | |

* cited by examiner

ENGINE SEALING ASSEMBLY

BACKGROUND AND SUMMARY

Vehicles may use a gasket to seal various components in an internal combustion engine.

For example, US2010/0109255 describes a gasket layer that allows for sealing between a cylinder head and an engine block. The gasket layer includes a number of structuring elements that may allow for concentrated load distribution. For example, the gasket layer includes a number of alternating elevations and depressions to increase the pressure load between the cylinder head and the engine block at each elevation and depression.

The inventors herein have recognized various issues with the above system. In particular, increasing the number of sealing structures increases the complexity of the gasket layer. Further, adding additional structure to the gasket layer increases the weight of the gasket layer. Further still, a cost associated with manufacturing the gasket layer is increased as a result of the alternating elevations and depressions.

As such, one example approach to address the above issues is to provide a narrow shim between two gasket layers such that the narrow shim coincides with a beading structure to increase the sealing potential of the gasket. Further, one or more of the gasket layers may include an aperture that exposes the narrow shim. In this way, it is possible to concentrate the applied load over the beading structure, while reducing load dissipation over the width of the shim. Specifically, a block side gasket layer may include a plurality of apertures that are staggered compared to a plurality of apertures in other gasket layers to reduce the clamping load in a region corresponding with the apertures. This configuration enables the clamping load may be distributed to beading structure regions, and thus concentrated with the beading structure regions. Further, by taking advantage of fewer materials, a weight of the engine can be reduced.

Note that the plurality of apertures may be any suitable shape without overlapping with a bearing region. Further, the plurality of apertures may have the added advantage of contributing to cooling of the engine block and/or cylinder head. Further still, variations in engine block and/or cylinder head structure may also enable enhanced engine cooling, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a gasket assembly that includes a plurality of apertures, which are arranged in such a way that a clamping load is concentrated over a beading region. This arrangement allows a width of a shim to be minimized while increasing the sealing potential between a cylinder head and an engine block. Various different apertures may be included in the disclosed system. For example, according to one embodiment, an aperture may expose the shim in a gasket assembly stack. In some embodiments, an aperture may expose more than one layer of the gasket assembly. Further, the gasket assembly may include one or more different apertures that concentrate the clamping load over the beading region. Further still, the gasket assembly may include one or more apertures that are staggered in one gasket assembly layer with respect to an aperture of another gasket assembly layer. It will be appreciated that the one or more apertures may differ in size and/or geometric shape.

Figure 1:
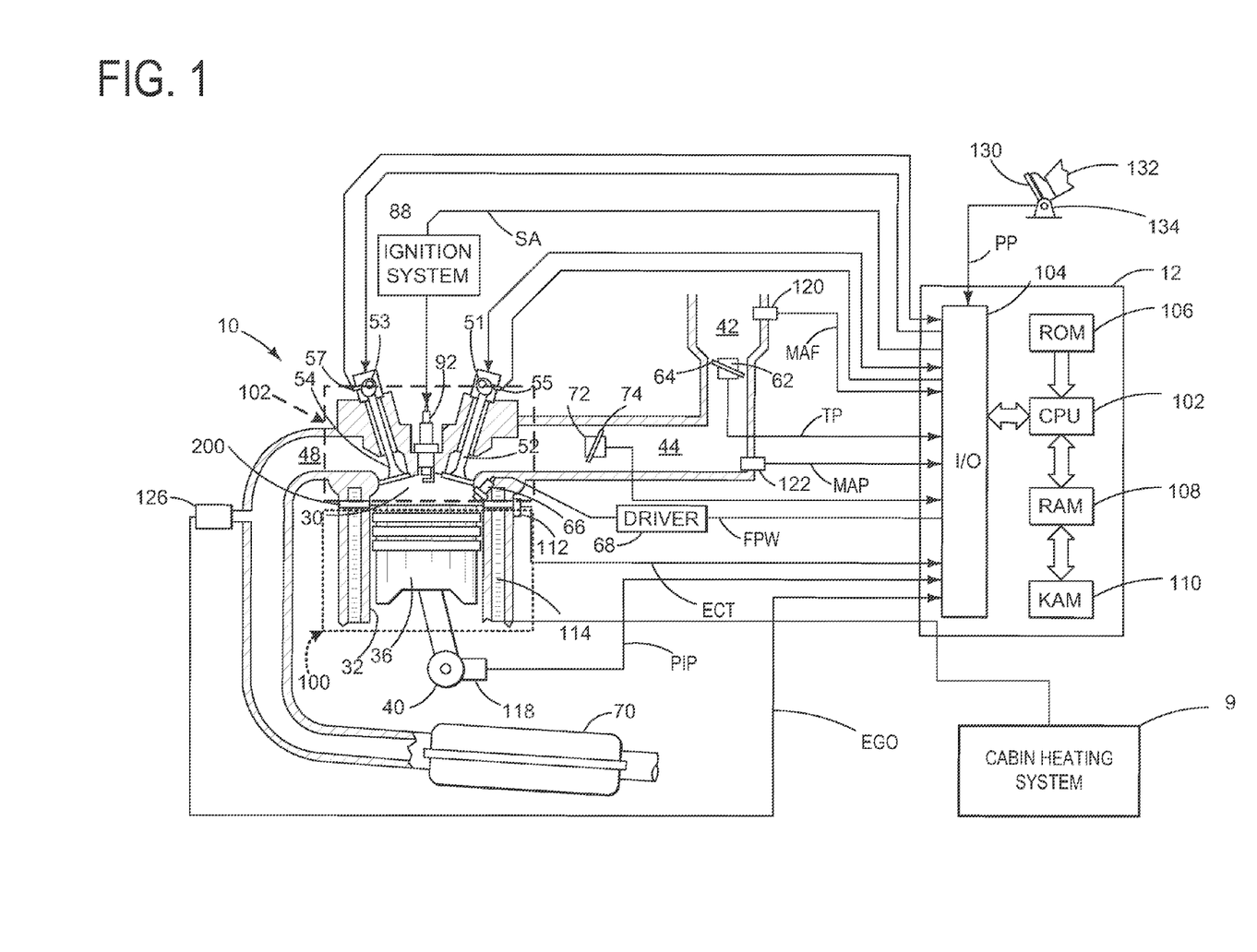
FIG. 1 shows a schematic diagram of an example engine including a gasket assembly according to an embodiment of the present disclosure.

FIG. 1 shows a schematic diagram of one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Engine 10 shows an example combustion cylinder 30 including an engine block region 100 and a cylinder head region 102. Engine block region 100 may include combustion cylinder walls 32 as described further below. Cylinder head region 102 may include one or more values for selectively communicating with an intake and an exhaust system, for example. Further, cylinder head region 102 may include a fuel injector, and a spark plug, for example. When installed, cylinder head region 102 may be fastened to engine block region 100 with gasket assembly 200 positioned between in order to form a tight seal between the cylinder head and the engine block. Gasket assembly 200 will be discussed further with respect to FIGS. 2A-3.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL)

systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 is coupled to the cabin heating system 9.

As described above, FIG. 1 shows only one cylinder of a multi-cylinder engine, and each cylinder may similarly include its own set of intake/exhaust valves, fuel injector, ignition system, etc.

Figure 2A:
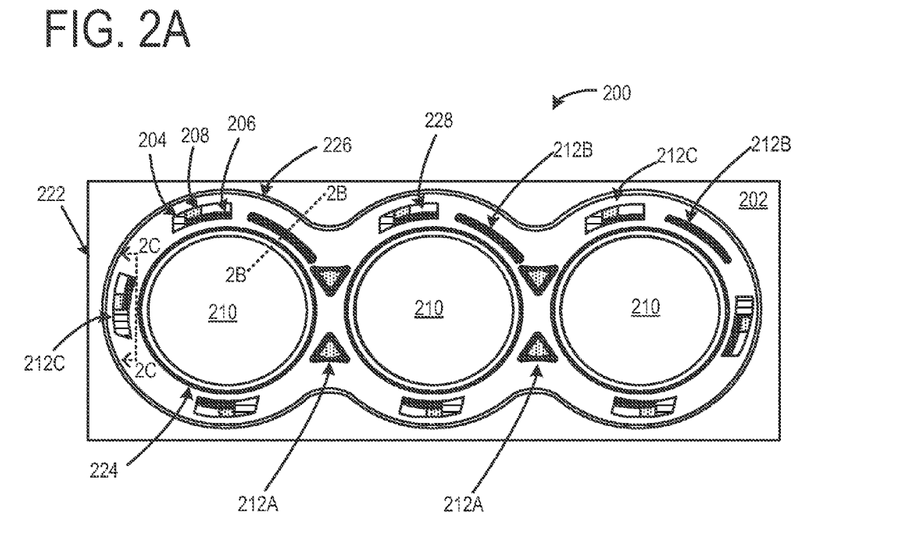
FIG. 2A shows a perspective view of an example gasket assembly that may be included in the example engine of FIG. 1.
Figure 2B:
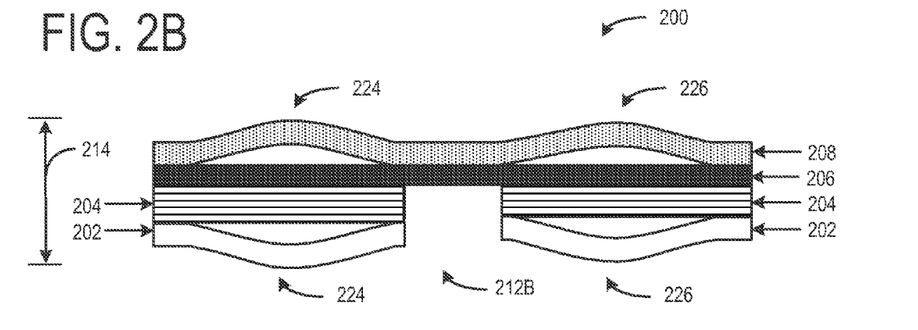
FIG. 2B shows a cross sectional view of a portion of the example gasket assembly of FIG. 2A taken along line 2B-2B.
Figure 2C:
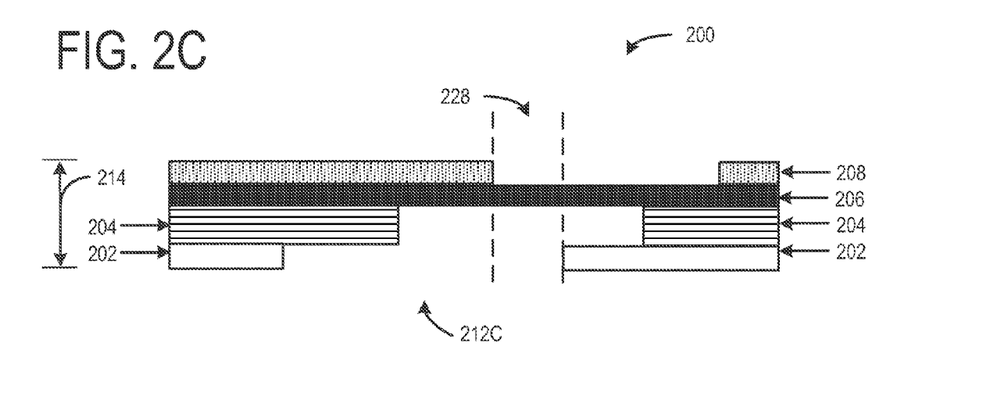
FIG. 2C shows a cross sectional view of a portion of the example gasket assembly of FIG. 2A taken along line 2C-2C.
Figure 2D:
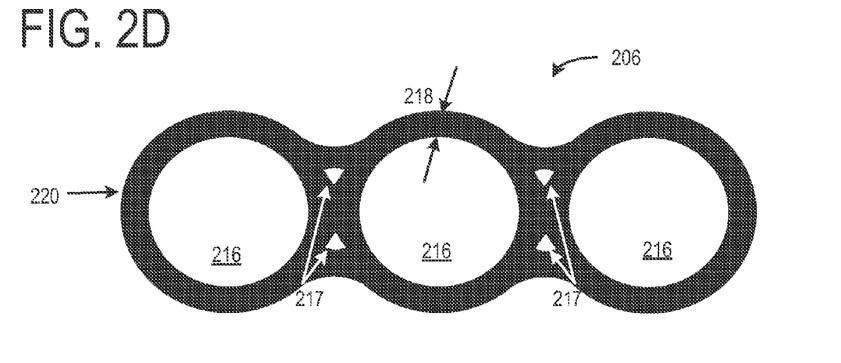
FIG. 2D shows an example shim that may be included in the example gasket assembly of FIG. 2A.

FIG. 2A shows a perspective view of an example gasket assembly 200 and FIG. 2B shows a cross sectional view of gasket assembly 200 along line 2B-2B of FIG. 2A. FIG. 2C shows a cross sectional view of gasket assembly 200 along line 2C-2C of FIG. 2A. FIG. 2D shows a perspective view of an example shim 206 that may be included in gasket assembly 200. As introduced above, gasket assembly 200 may be used to seal one or more combustion chambers. For example, gasket assembly 200 may form a pressure tight seal between an engine block and a cylinder head, as described above. In other words, gasket assembly 200 may be positioned between the engine block and the cylinder head.

As best shown in FIG. 2A, gasket assembly 200 may include bore spaces 210 configured to align with a combustion cylinder. In the illustrated embodiment, gasket assembly 200 may be configured for three combustion cylinders for one bank of a V-6 engine, for example. Therefore, it will be appreciated that a V-6 engine may have two gasket assemblies as described herein, wherein one gasket assembly is positioned on one bank and the other gasket assembly is positioned on the other bank of the V-6 engine. It is to be understood that the gasket assembly may be configured for any engine without departing from the scope of this disclosure. As one example, gasket assembly 200 may include four bore spaces configured to align with four combustion cylinders on one bank of a V-8 engine, for example. Further, it will be appreciated that the V-8 engine may include a gasket assembly for each bank of cylinders.

Referring to FIGS. 2A-2C, gasket assembly 200 may include a block side layer 202, a spacer 204, a shim 206, and a head side layer 208, as shown. Block side layer 202 may be positioned adjacent to an engine block surface, and head side layer 208 may be positioned adjacent to a cylinder head surface, for example. Further, spacer 204 and shim 206 may be positioned between block side layer 202 and head side layer 208 as shown. Therefore, spacer 204 and shim 206 may be internal layers of gasket assembly 200. For example, spacer 204 may be positioned between block side layer 202 and shim 206. Also, shim 206 may be positioned between spacer 204 and head side layer 208, for example. It will be appreciated that gasket assembly 200 may be in any suitable stack order without departing from the scope of this disclosure. Additionally or alternatively, gasket assembly 200 may comprise one or more other layers. As such, gasket assembly 200 may include more layers or fewer layers and thus is not limited to the four layers shown in the illustrated embodiment. For example, gasket assembly 200 may include a second spacer, positioned between shim 206 and head side layer 208.

Block side layer 202 may contact a surface of the engine block region, such as a surface continuous with cylinder walls 32 of combustion cylinder 30, for example. Block side layer 202 may be a steel plate. For example, block side layer 202 may be a steel core plate, however other materials are possible. Further, block side layer 202 may include one or more apertures 212 that may expose one or more other layers of gasket assembly 200, for example. As another example, block side layer 202 may include one or more apertures 212 that create an opening through gasket assembly 200. In other words, one or more apertures 212 may expose a void through a thickness 214 of gasket assembly 200. For example, such an opening may be configured to receive a bolt, a fastener, or another component to fasten the cylinder head to the engine block.

As another example, such an opening may be a conduit for a fluid such as coolant, oil, and/or another fluid. Further, by aligning apertures of different sizes between the different layers, such fluids may be metered such that an appropriate amount of coolant and/or oil is distributed to the engine block and/or cylinder head, for example. In some embodiments, the gasket assembly may include a passage for an engine coolant system and thus may enable coolant or another fluid to flow between the cylinder head region and the engine block region. As such, a combustion cylinder temperature may be regulated by the engine coolant system. Such an example will be discussed further with respect to FIG. 3.

Further, by staggering a position of the apertures within each layer such that an aperture of one layer is staggered with respect to an aperture of another layer, the gasket assembly may include apertures around a perimeter of each bore without the apertures of each layer aligning with each other. However, it will be appreciated that some portions of the aperture of one layer may align with some portions of the aperture of another layer. In this way, apertures may be staggered around the perimeter of each bore within the various layers of gasket assembly 200 such that shim layer 206 is unloaded 360° around the perimeter of each bore. Staggering apertures between the various layers is discussed in more detail below.

Turning back to FIGS. 2A-2C, head side layer 208 may be a steel plate, for example. As such, head side layer 208 may be similar in composition to block side layer 202. For example, head side layer 208 may be a steel core plate. However, it will be appreciated that head side layer 208 may differ to some degree from block side layer.

Spacer 204 may be an internal layer of the gasket assembly. Various controls may be housed within and/or coupled to spacer 204. For example, spacer 204 may include various sensors for providing feedback to a controller. As such, an operating condition of the engine may be monitored. For example, spacer 204 may include a temperature sensor, a pressure sensor, and/or another sensor.

Shim 206 may also be an internal layer of the gasket assembly. Shim 206 may be configured to concentrate a load for combustion sealing when gasket assembly is positioned between and fastened to the cylinder head and the combustion cylinder.

As best shown in FIG. 2D, shim 206 may have a ring like structure including more than one ring coalesced together. In other words, shim 206 may have more than one ring-like structure fused together. In the illustrated embodiment, shim 206 includes three ring-like structures fused together. As shown, shim 206 may include openings 216 that align with bore spaces 210. Further, shim 206 may include a plurality of apertures 217 that are arranged between two bore spaces, for example. Apertures 217 may be configured to enable coolant to pass through shim 206, when gasket assembly 200 is installed on an engine, for example. Therefore, apertures 217 may align with similar apertures in one or more other layers of gasket assembly 200.

Further, shim 206 may have a width 218 that generally follows a perimeter of each combustion cylinder. Width 218 may substantially overlap with one or more load concentration regions, such as a beading region. Such beading regions will be discussed further below. Width 218 may be substantially smaller than the other layers of gasket assembly 200. As one non-limiting example, shim 206 may be approximately 7 to 8 millimeters wide. Further, shim 206 may be substantially thin, for example, shim 206 may have a thickness of 0.1 millimeters, which is provided as one non-limiting example. In other words, an outer perimeter 220 of shim 206 may not align with an outer perimeter 222 of gasket assembly 200.

The inventors herein have recognized that increasing the width of shim 206 in order to handle the other layers of the gasket assembly, also dissipates a clamp load when the gasket assembly is installed in an engine. As such, the load dissipation over the width of the shim wastes the available clamp load which may lead to inadequate sealing between the cylinder head and the engine block. In some scenarios, the available load may already be limited due to bolt size and/or due to bore distortion of the combustion cylinders. Thus, increasing the width of the shim in such scenarios may further limit the available clamping load. As such, gasket durability in terms of holding a tight seal between the engine block and the cylinder head may be compromised.

The present disclosure describes a gasket assembly that overcomes as least some of the aforementioned issues by mating the shim with the remaining layers of the gasket assembly so as to reduce the load transmitted to the shim. For example, by including one or more apertures in the block side layer, one or more apertures in the spacer layer, and/or one or more apertures in the cylinder side layer, the clamping load can be concentrated over the beading regions. For example, one or more apertures in the block side layer may be positioned outside of the beading regions to improve load balance. Further, one or more apertures of the block side layer may be staggered with respect to one or more apertures of another gasket assembly layer. Thus, a durability of the gasket assembly in terms of holding a tight seal over time can be improved.

Briefly, block side layer 202 and head side layer 208 may include one or more beading regions to enhance the sealing capability of gasket assembly 200. For example, as best shown in FIG. 2A, block side layer 202 may include an inner beading region 224 and an outer beading region 226. Inner beading region 224 may follow a perimeter of a bore space, whereas outer beading region 226 may enclose all the bore spaces, for example.

The beading regions may be configured to concentrate a load applied to gasket assembly 200. For example, the cylinder head may be clamped to engine block with gasket assembly 200 positioned between, as described above. The beading regions may concentrate the load associated with clamping (or other fastening method) the cylinder head to the engine block to form a pressure/fluid tight seal. In this way, the potential for an air fuel mixture, or other fluid, to leak to the atmosphere at the interface between the cylinder head and the engine block is reduced.

Beading regions 224 and 226 may be silicone rubber beads molded to block side layer 202 and head side layer 208, for example. Further, beading region 224 may extend away from spacer 204 and shim 206. As shown, the beading region of block side layer 202 may align with the beading region of head side layer 208. Beading regions 224 and 226 may have increased structural integrity. As best shown in FIG. 2B, beading regions 224 and 226 may include a dome like structure, however other structures are possible. For example, beading regions 224 and 226 may be trapezoidal.

As introduced above, block side layer 202 may include one or more apertures 212 to concentrate a clamping load over beading regions 224 and 226, and further, to reduce a clamping load to shim 206. As shown, one or more apertures 212 may expose one or more other layers of gasket assembly 200. For example, apertures 212A and apertures 212B may be a void in block side layer 202 that exposes an internal layer such as cylinder side layer 208 and/or shim 206. As shown, apertures 212A and apertures 212B may differ in shape and/or location. As shown, each aperture 212A may be an irregular shape positioned between two bore spaces 210. For example, each aperture 212A may be shaped as a reuleaux triangle; however, other shapes are possible without departing from the scope of this disclosure. As shown, apertures 212A may align with apertures 217 of shim 206 (e.g., see FIG. 2D) to expose cylinder side layer 208, for example. As described above, aligning such apertures may provide a conduit for coolant passage between the various gasket assembly layers. As another example, such aligning of apertures may provide a conduit for oil passage between various gasket assembly layers. It will be appreciated that apertures between various layers may be aligned with respect to a centroid of each aperture; however, apertures may be aligned in other ways. For example, a portion of one aperture may align with a portion of an aperture in an adjacent gasket layer, for example. Further, aligned apertures may be different sizes, as shown. For example, apertures 217 may be smaller than apertures 212A. In this way, a fluid may be metered as the fluid is distributed through the gasket assembly. Further, such an aperture, may contribute to unloading of shim 206 such that a load can be concentrated on beading regions 224 and 226, for example.

Each aperture 212B may be an arc-like shape positioned along a perimeter of a bore space, for example. However, it will be appreciated that each aperture 212B may be another shape without departing from the scope of this disclosure. As shown, apertures 212B may expose shim 206. Such an aperture, may contribute to unloading of shim 206 such that a load can be concentrated on beading regions 224 and 226, for example.

It will be appreciated that while aperture 212A and aperture 212A may differ to some degree, both apertures 212A and apertures 212B may be positioned outside of an inner beading region (e.g., beading region 224). Further, both apertures 212A and apertures 212B may be positioned between an inner beading region and an outer beading region. For example, apertures 212A and 212B may be positioned between beading region 224 and beading region 226.

As another example, aperture 212C may expose more than one layer of gasket assembly 200. Further, aperture 212C may be aligned with an aperture of another layer, wherein apertures of adjacent layers are staggered with respect to each other. As shown, aperture 212C may expose one or more of spacer 204, shim 206, and head side layer 208. Further, aperture 212C may include a void 228 that provides an opening through the thickness of gasket assembly 200.

As best shown in FIG. 2C, aperture 212C may be aligned with corresponding apertures of one or more other layers of gasket assembly 200. For example, spacer 204 and cylinder side layer 208 may each include an aperture that has a staggered position with respect to a position of aperture 212C. In other words, aperture 212C may be offset with respect to corresponding apertures of spacer 204 and cylinder side layer 208. It will be appreciated that aperture 212C and corresponding staggered apertures of spacer 204 and cylinder side layer 208 may be similar sizes, or may be different sizes without departing from the scope of this disclosure. Further, it will be appreciated that the perspective view shown in FIG. 2C shows shim 206, however, an outer perimeter of shim 206 may be exposed through at least a portion of aperture 212C as shown in FIG. 2A. Therefore, FIG. 2C shows opening 228 as it would appear outside of the outer perimeter of shim 206. As shown, opening 228 may be a region where aperture 212C, the corresponding aperture of spacer 204, and the corresponding aperture of cylinder side layer 208 overlap with each other, for example.

Referring back to FIG. 2A, it will be appreciated that a plurality of apertures 212C may be positioned around a perimeter of each bore 210. By staggering apertures in adjacent gasket assembly layers, a load may be concentrated over beading region 224 and beading region 226 while reducing the load applied to shim 206. It will be appreciated that each bore space may be surrounded by apertures in the various gasket assembly layer so as to have 360° unloading of shim 206.

Further, it will be appreciated that the staggered apertures may be any suitable shape and may be spaced around a perimeter of each bore in various ways. Further, each bore may have any suitable number of staggered apertures positioned around a bore perimeter. Therefore, the gasket assembly of the present disclosure is not limited to the embodiments illustrated in FIGS. 2A-2D.

In this way, gasket assembly 200 may include a plurality of apertures, wherein each aperture may contribute to load concentrating over a beading region. By removing material from the block side layer, for example, a clamping load is preventing from being applied in an area coinciding with the aperture, thus the available clamping load is available for distribution to other areas, such as beading regions, as described above. Thus, a clamping load potential can be increased over the beading regions in order to form a more durable seal between the engine block and the cylinder head.

It will be appreciated that gasket assembly 200 is provided by way of example and as such is not meant to be limiting. Therefore, gasket assembly 200 is not limited to the illustrative embodiments and may include may include additional and/or alternative layers in any suitable layering order, and gasket assembly 200 may include additional and/or alternative features than those shown. For example, gasket assembly 200 may include one or more holes for installing gasket assembly 200. Further, gasket assembly 200 may include one or more holes for other features of engine 10. Furthermore, any suitable layer of gasket assembly 200 may include any suitable number of apertures. Further still, each aperture may be any suitable geometric shape without departing from the scope of this disclosure.

Figure 3:
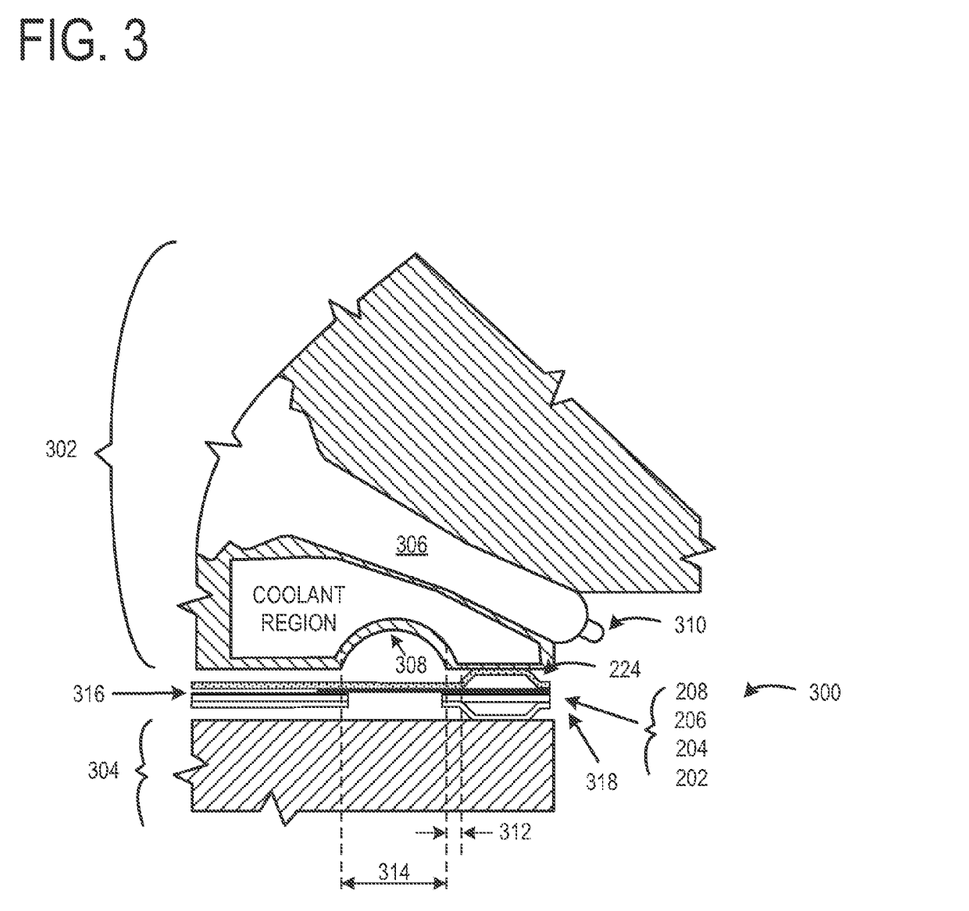
FIG. 3 shows a perspective view of an example gasket assembly installed on an example engine according to an embodiment of the present disclosure.

FIG. 3 shows an example gasket assembly 300 installed on an engine. As shown, gasket assembly 300 is positioned between cylinder head 302 and engine block 304. It will be appreciated that gasket assembly 300 may be similar to gasket assembly 200, and thus may include like features. It will be appreciated that like features may be reference with common numbers and for the sake of brevity will not be discussed further.

As shown, cylinder head 302 may be configured to receive a fuel injector 306 for injecting fuel into the combustion cylinder. During engine operation, the temperature of the combustion cylinder may increase. As such, a coolant system, including an integrated coolant region 308, may be provided to regulate the temperature of cylinder head 302 and/or engine block 304.

As shown, cylinder head 302 may include a depression 308 to encourage coolant to flow, concentrate, and/or pool near a tip 310 of fuel injector 306. Depression 308 may be a recessed area of the cylinder head, for example. As shown, depression 308 may be spaced apart from beading region 224 by a distance indicated generally at 312. Further, depression 308 may have a width indicated generally at arrow 314. As shown, width 314 may span a region of shim 206. In other words, shim 206 may extend beyond depression 308 in both directions.

Further, a position of depression 308 may coincide with a position of an aperture of block side 202, spacer 204, and/or cylinder side 208. In this way, cooling of the injector tip may be enhanced by co-localizing the recessed area with the aperture.

Further, as introduced above, shim 206 may be a narrow shim and as such may not extend to a full length of the gasket assembly. As shown in FIG. 3, gasket assembly 300 may include block side layer 202, spacer 204, and head side layer 208 with a common outer perimeter 316, whereas shim 206 may not have an outer perimeter that aligns with the common outer perimeter. However, each layer of the gasket assembly may have a common inner perimeter 318, as shown.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
   a cylinder head;
   an engine block; and
   a gasket assembly sealing the cylinder head to the engine block, the gasket assembly including a plurality of overlapping and offset apertures staggered between adjacent gasket layers and positioned between an inner beading region and an outer beading region.

2. The system of claim 1, wherein the gasket assembly includes a block side layer, a spacer, a shim, and a head side layer.

3. The system of claim 2, wherein the block side layer includes a first set of the plurality of apertures staggered with respect to a second set of the plurality of apertures of the spacer.

4. The system of claim 1, wherein the inner beading region is positioned around a perimeter of a bore space and wherein the plurality of apertures are staggered around the perimeter of the bore space within the gasket layers.

5. The system of claim 1, wherein the outer beading region is positioned around a plurality of bore spaces.

6. The system of claim 1, wherein one or more of the plurality of apertures in the adjacent gasket layers overlap without aligning to expose a shim.

7. The system of claim 6, wherein the shim is a narrow shim that follows a perimeter of the plurality of bore spaces.

8. The system of claim 1, wherein the cylinder head includes a depression to concentrate an engine coolant near a tip of a fuel injector.

9. The system of claim 8, wherein one or more of the plurality of apertures exposes a shim, a spacer, and a head side layer of the gasket assembly.

10. The system of claim 9, wherein the one or more of the plurality of apertures overlap to form a void to accommodate a coolant conduit.

11. The system of claim 1, wherein one or more of a plurality of apertures are positioned between a first inner beading region and a second inner beading region.

12. A system for an engine, comprising:
    a fuel injector;
    a cylinder head including a depression and a coolant region;
    an engine block; and
    a gasket assembly sealing the cylinder head to the engine block, the gasket assembly including a beading region around a perimeter of an interface between the cylinder head and the engine block and a ring-like shim that extends beyond the depression of the cylinder head, the gasket assembly including a plurality of apertures, a position of the plurality of apertures staggered between adjacent gasket layers and around a perimeter of each bore of the gasket assembly.

13. The system of claim 12, wherein the depression is recessed in the cylinder head and spaced apart from the beading region of the gasket assembly.

14. The system of claim 13, wherein the gasket assembly further includes a block side layer, a spacer, a shim, and a head side layer.

15. The system of claim 14, wherein the block side layer, the spacer, and the head side layer have a common outer perimeter.

16. The system of claim 15, wherein the shim has a perimeter that is not the common outer perimeter and wherein a width of the shim is smaller than a width of the block side layer, the spacer, and the head side layer.

17. The system of claim 13, wherein the depression allows coolant to concentrate within the coolant region near a tip of the fuel injector to regulate a temperature of the tip.

18. A system for an engine comprising:
    a cylinder head;
    an engine block; and
    a gasket assembly sealing the cylinder head to the engine block, the gasket assembly including a block side layer, a spacer, a shim, and a head side layer, wherein the block side layer includes a first plurality of apertures and the spacer includes a second plurality of apertures, the first plurality of apertures and the second plurality of apertures offset from one another and partially overlapping to expose the shim.

19. The system of claim 18, wherein the spacer and the shim are internal layers to the block side layer and the head side layer and wherein the head side layer includes a third plurality of apertures offset from the first plurality of apertures and the second plurality of apertures.

20. The system of claim 18, wherein the first plurality of apertures and the second plurality of apertures concentrate a clamping load over a beading region.

* * * * *